United States Patent
Happenhofer et al.

(10) Patent No.: US 6,412,170 B1
(45) Date of Patent: Jul. 2, 2002

(54) METHOD OF MANUFACTURING A CONTROL FLAP

(75) Inventors: Werner Happenhofer, Wackersdorf; Mathias Scheytt, Neutraubling; Helmut Schwaiger, Regensburg; Stefan Schmid, Obertraubling, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/390,168

(22) Filed: Sep. 7, 1999

Related U.S. Application Data

(63) Continuation of application No. PCT/DE98/00292, filed on Feb. 3, 1998.

(30) Foreign Application Priority Data

Apr. 24, 1997 (DE) .......................................... 197 17 347

(51) Int. Cl.⁷ ................................................ B23P 15/00
(52) U.S. Cl. .............................. 29/888.025; 29/890.13; 29/517
(58) Field of Search ...................... 29/888.025, 890.124, 29/890.127, 890.13, 517, 460, 888.01, 888.011, 458; 264/242, 279, 271.1; 251/306, 305, 308

(56) References Cited

U.S. PATENT DOCUMENTS

| | | | | |
|---|---|---|---|---|
| 2,385,510 A | * | 9/1945 | Harwood | ................ 251/11 |
| 3,549,123 A | * | 12/1970 | Bell | ........................ 251/306 |
| 3,724,812 A | | 4/1973 | Richardson | .............. 251/306 |
| 4,209,485 A | * | 6/1980 | Greenspan | ................ 264/242 |
| 4,344,396 A | * | 8/1982 | Yamada | ................... 123/337 |
| 4,932,114 A | * | 6/1990 | Morse et al. | ............... 29/443 |
| 5,221,387 A | * | 6/1993 | Robbins et al. | ............. 156/85 |
| 5,293,685 A | * | 3/1994 | Meyer et al. | .......... 29/890.124 |
| 5,348,232 A | * | 9/1994 | Babitzka et al. | ......... 239/585.4 |
| 5,705,112 A | * | 1/1998 | Gram | ........................ 264/242 |
| 5,906,046 A | * | 5/1999 | Abplanalp et al. | ..... 29/890.124 |
| 6,019,931 A | * | 2/2000 | Kashiwagi | ................ 264/496 |

FOREIGN PATENT DOCUMENTS

| | | |
|---|---|---|
| DE | 19516927 A1 | 11/1996 |
| EP | 0494344 A1 | 7/1992 |
| FR | 2687601 | 8/1993 |

* cited by examiner

Primary Examiner—S. Thomas Hughes
Assistant Examiner—Marc Butler
(74) Attorney, Agent, or Firm—Herbert L. Lerner; Laurence A. Greenberg; Werner H. Stemer

(57) ABSTRACT

A first sleeve and a second sleeve are put onto the shaft at a predetermined axial distance apart and are pressed radially. The shaft is encapsulated between the first and the second sleeve with a thermoplastic in such a way that a vane body, which has at least one aperture, is formed. The vane body is encapsulated with a sealing compound in such a way that a sealing lip is formed on the vane body at the margins.

6 Claims, 4 Drawing Sheets

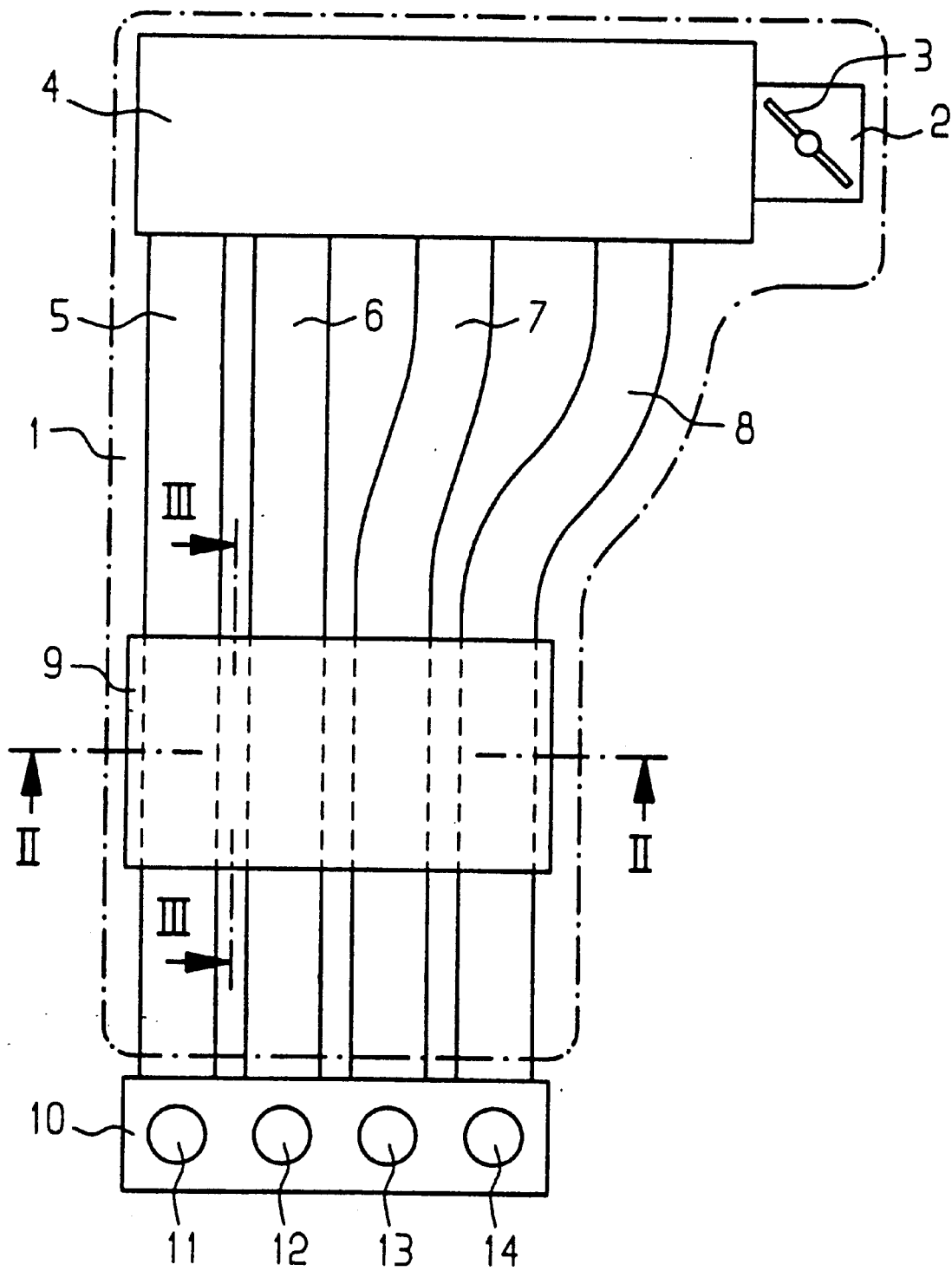

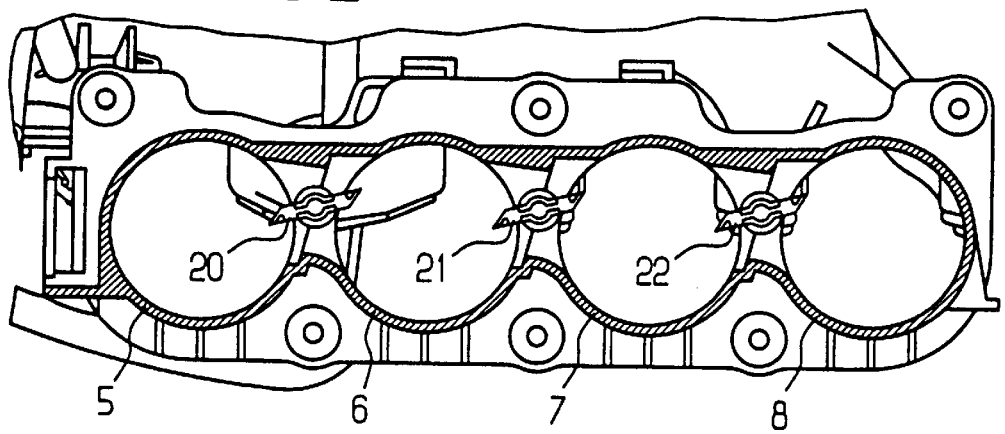
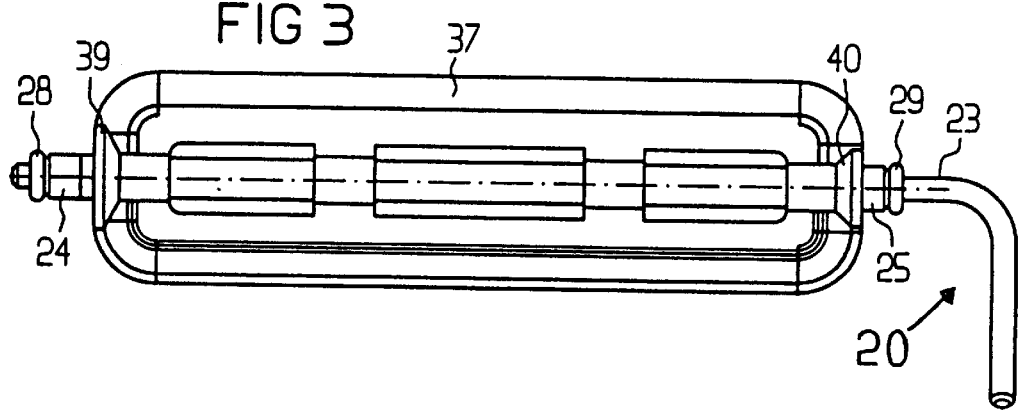
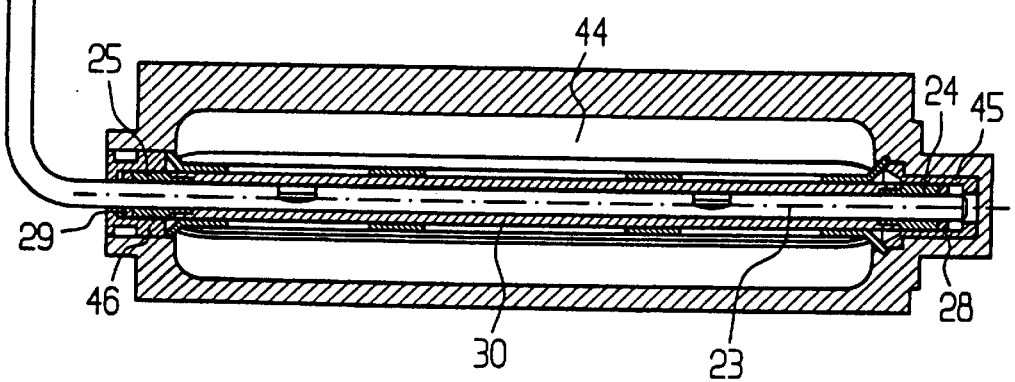

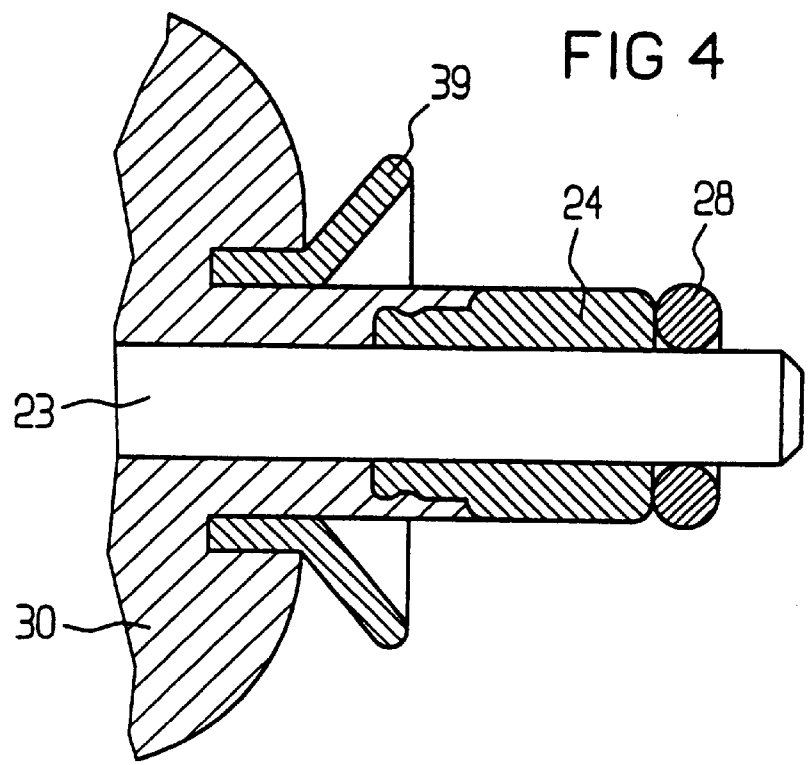
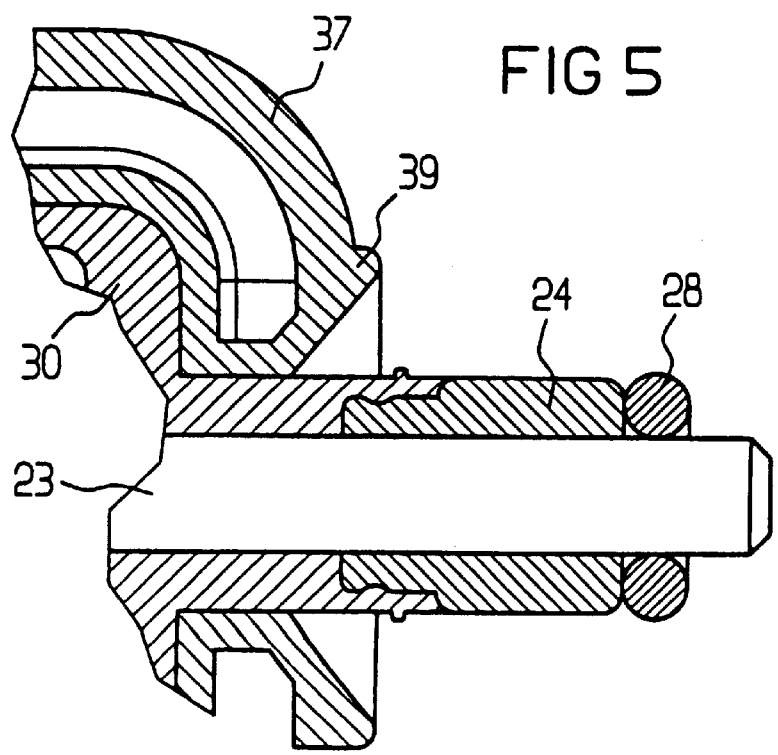

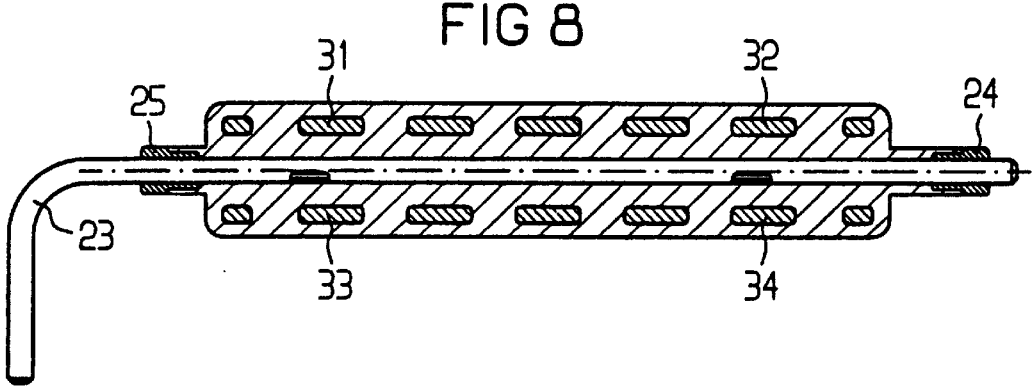
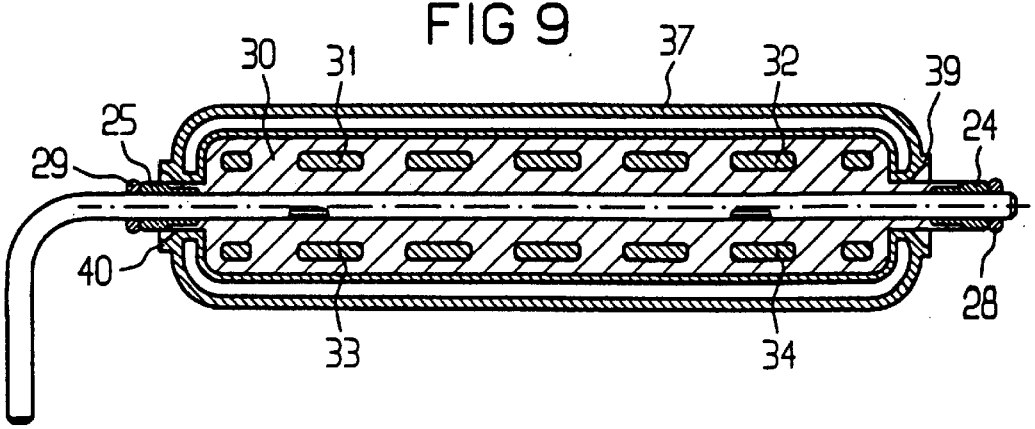

METHOD OF MANUFACTURING A CONTROL FLAP

CROSS-REFERENCE TO RELATED APPLICATION

This is a continuation of copending International Application PCT/DE98/00292, filed Feb. 3, 1998, which designated the United States.

BACKGROUND OF THE INVENTION

Field of the Invention

The invention relates to a method of manufacturing a control flap, which is disposed in particular in an intake duct of an internal combustion engine.

International Patent Application WO 96/07022 discloses a control flap which has a shaft and an elongated configuration along an axis of rotation of the shaft. The control flap is disposed in an opening between two inlet pipes of an intake device and is mounted so as to be pivotable. The inlet pipes branch off from a first manifold and lead into inlets of cylinders of the internal combustion engine. If the control flap is pivoted in such a way that the opening is closed, the effective length of the inlet pipes, that is, the length over which the gas column in the inlet pipe oscillates, corresponds to the length of the inlet pipes from the first manifold to he inlets of the cylinders. If the control flap is pivoted in such a way that the opening is opened, the effective length of the inlet pipes corresponds to the distance from the opening up to the inlets of the cylinders. Depending on measured values of the operating variables of the internal combustion engine, one of the two effective lengths of the inlet pipes is set. Thus the charging of the cylinders can be improved and the maximum torque can therefore be increased.

Provided at the opening are bearing collars, against which the control flap comes to bear when it is pivoted in such a way that the opening is closed.

U.S. Pat. No. 3,724,812 discloses a control flap which has a plate with an encircling groove at its margins. Slots, which communicate with the groove, are made in the plate. A seal is inserted into the groove and the slots.

SUMMARY OF THE INVENTION

It is accordingly an object of the invention to provide a method of manufacturing a control flap that overcomes the above-mentioned disadvantages of the prior art methods of this general type, which is simple to manufacture and reliable.

With the foregoing and other objects in view there is provided, in accordance with the invention, a method of manufacturing a control flap, which includes: providing a shaft; disposing a first sleeve and a second sleeve onto the shaft at a predetermined axial distance apart from each other and radially pressing the first sleeve and the second sleeve; forming a vane body having at least one aperture by encapsulating the shaft between the first sleeve and the second sleeve with a thermoplastic; and encapsulating the vane body with a sealing compound and forming a sealing lip at margins on the vane body from the sealing compound.

The method according to the invention is distinguished by the fact that the shaft is encapsulated with a thermoplastic in such a way that the vane body is formed. The vane body is configured in such a way that it has at least one aperture. A sealing compound, with which the vane body is encapsulated, penetrates into the aperture, so that there is a positive-locking connection between the sealing compound and the vane body.

Other features which are considered as characteristic for the invention are set forth in the appended claims.

Although the invention is illustrated and described herein as embodied in a method of manufacturing a control flap, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, block diagram of an internal combustion engine according to the invention;

FIG. 2 is a sectional view of the internal combustion engine according to FIG. 1 taken along the line II—II;

FIG. 3 is side-elevational view of a control flap;

FIG. 4 is an enlarged, fragmentary, sectional view of the control flap taken along an axis of rotation of the control flap;

FIG. 5 is an enlarged, fragmentary, sectional view of the control flap;

FIG. 6 is a sectional view taken along a line III—III of the internal combustion engine shown in FIG. 1;

FIG. 7 is a sectional view of a first working step for producing the control flap;

FIG. 8 is a sectional view of a second working step for producing the control flap; and FIG. 9 is a sectional view of a third working step for producing the control flap.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown an intake device 1 of an internal combustion engine containing an intake connection 2, in which a throttle valve 3 is disposed. A first manifold 4 communicates with the ambient air via the intake connection 2. Inlet pipes 5, 6, 7, 8 are run from the first manifold 4 via a second manifold 9 to inlets of cylinders 11, 12, 13, 14. The cylinders 11, 12, 13, 14 are disposed in an engine block 10. Disposed in a region of the second manifold 9 are control flaps 20, 21, 22, which are of elongated construction and are mounted so as to be pivotable (see FIG. 2). Depending on an operating variable such as, for example, a rotational speed N of a non-illustrated crankshaft and/or an air mass flow and/or an inlet-pipe pressure, the control flaps 20, 21, 22 are pivoted into an open position or a closed position. In the open position of the control flaps 20, 21, 22, the inlet pipes 5, 6, 7, 8 communicate with one another via openings, so that the effective inlet-pipe length, that is, the region of continuous flow in the inlet pipe, corresponds to the distance of the openings from the inlets of the cylinders 11, 12, 13, 14. In the closed position of the control flaps 20–22, the control flaps 20–22 close the openings between the inlet pipes 5, 6, 7, 8, so that an effective length of the inlet pipes 5–8 corresponds to a length of the inlet pipes from the first manifold 4 up to the inlets of the cylinders 11, 12, 13, 14.

The control flaps 20, 21, 22 are of identical construction. The construction of the control flap 20 is described below by way of example. The control flap 20 (FIG. 3) has a shaft 23, which is bent at right angles at a free end. As a result, simple pivoting between the open position and the closed position in the fitted state is possible via a linkage (not shown), which is driven by an actuator (also not shown). The actuator is preferably a pressure capsule or an electric motor. A first sleeve 24 and a second sleeve 25 are put onto the shaft 23 at a predetermined distance apart. The first and second sleeves 24, 25 are made to be a precise fit and serve for mounting in a bearing bush 45, 46 (see FIG. 6). In addition, a first and a second damping ring 28, 29 are preferably put onto the shaft in such a way that they come to bear with the first sleeve 24 and the second sleeve 25 respectively. The shaft 23 is connected to a vane body 30 in a positive-locking manner. A positive-locking connection is effected by embossed lugs 23a, b. The shaft 23 and the vane body 30 are therefore rigidly connected. In addition, the vane body 30 is provided with apertures 31, 32, 33, 34 (see FIG. 8). The vane body 30 is encapsulated with a sealing compound, that is formed in such a way that it forms a sealing lip 37 at the margins of the control flap, and the sealing lip 37, in the closed state, comes to bear with a bearing collar of the opening and thus tightly closes the opening. In addition, the sealing compound forms a first and a second sealing hood 39, 40, which are disposed concentrically to the shaft 23 at the opposite axial ends of the control flap 20. The sealing hoods 39, 40 are each open to the side that is remote from the control flap 20. On the side that faces the control flap 20, they are connected to the control flap 20 in a positive-locking manner.

FIG. 4 shows an enlarged detail of the control flap 20 in a section along the axis of rotation of the control flap 20. The sealing hood 39 is of a conical configuration. It is made of an elastic material, preferably an elastomer. The sealing hood 39 may also advantageously be of parabolic, hemispherical or cylindrical configuration.

FIG. 5 shows an enlarged detail of a preferred embodiment of the control flap 20 in a sectional view along the axis of rotation of the control flap 20. The sealing hood 39 projects beyond the sealing lip 37 in the form of a bead.

FIG. 6 is a sectional representation along a section line III—III according to FIG. 1. The control flap 20 is inserted into an opening 44 and the first bearing bush 45 and the second bearing bush 46. The first and second bearing bushes 45, 46 are preferably produced from bronze and are a precise fit with respect to the first and second sleeves 24, 25. The control flap 20 is shown in its open state in FIG. 6. The first and the second sealing hoods 39, 40 are pressed against the first and the second bearing bushes 45, 46 respectively, but, depending on the applied pressure, can shift outward on account of their elasticity. An axial seal of the control flap 20 around the bearing bush is thus produced with simple devices. The axial seal ensures that pressure pulsations in the closed state of the control flap 20 are not transmitted from the inlet pipe 5 to the inlet pipe 6 and vice versa. Furthermore, compensation for axial play with a floating bearing configuration is effected by the first and second sealing hoods 39, 40. This ensures that the control flap 20 is mounted centrally in the opening 44 irrespective of temperature and irrespective of production tolerances. Furthermore, the sealing hood 39, 40 dampens noises caused by vibrations of the internal combustion engine and produced by the first or second bearing bush 45, 46 and the first and second sleeves 24, 25 respectively. In addition, the sealing hood 39, 40 greatly dampens an overflow noise which is caused by clattering of the control flap 20 and pressure differences between the inlet pipes 5, 6. This is an important advantage, since the overflow noise becomes audible as unpleasant whistling, and increasingly stringent statutory provisions which establish the limit values for the amplitude of the sound waves produced by a motor vehicle are in force.

The manufacture of the control flap is described below. In a first production step, the shaft 23 (FIG. 7) is bent at right angles at a free end and is provided with the embossed lugs 23a, b. In a cost-effective embodiment, the shaft 23 has larger production tolerances. Machining of the shaft 23 is dispensed with. The first sleeve 24 and the second sleeve 25 are then put onto the shaft 23 at a predetermined axial distance apart and are pressed radially. The sleeves 24, 25 are preferably configured to be a precise fit with respect to the bearing bushes.

In a second working step (FIG. 8), the shaft 23 is put into an injection mold and is encapsulated between the first and the second sleeve 24, 25 with a thermoplastic in such a way that the vane body 30 is formed. The embossed lugs 23a, b ensure that the vane body 30 is connected to the shaft in a positive-locking manner. The vane body 30 has the plurality of apertures 31, 32, 33, 34.

The vane body 30 (FIG. 9) is then encapsulated with a sealing compound, which is preferably formed as an elastomer, in such a way that the sealing lip 37 is formed on the vane body at the margins. The encapsulation with the sealing compound is preferably effected in such a way that the first and the second sealing hoods 39, 40 form at the opposite axial ends of the vane body 30. The vane body 30 is completely encapsulated with the sealing compound. The sealing lip 37 and the first and second sealing hoods 39, 40 are therefore produced in one injection-molding operation.

The apertures 31, 32, 33, 34 are preferably made as elongated holes and are filled with the sealing compound after the encapsulation. A positive-locking connection with the vane body 30 is thereby ensured. This has the advantage that no adhesive or fastener has to be used, vulcanization can be dispensed with, and the sealing compound is in firm contact even if high friction forces due to a flowing fluid act on it.

The manufacturing method described has the advantage that the control flap 20–22 can be produced in very few production steps and is lightweight but nonetheless has high mechanical durability. If the shaft 23 is made of steel, high rigidity of the control flap 20–22 is ensured. In addition, the sealing behavior of the control flap 20–22 is optimized.

The vane body 30 may also be configured alternatively with three or four arms.

The invention is not restricted to the exemplary embodiments shown here.

We claim:

1. A method of manufacturing a control flap, which comprises:
- providing a shaft;
- disposing a first sleeve and a second sleeve onto the shaft at a predetermined axial distance apart from each other and radially pressing the first sleeve and the second sleeve;
- forming a vane body having at least one aperture by encapsulating the shaft between the first sleeve and the second sleeve with a thermoplastic; and
- encapsulating the vane body with a sealing compound and forming a sealing lip at margins on the vane body from the sealing compound.

2. The method according to claim 1, which comprises squeezing the shaft at a point between the first sleeve and the second sleeve to form an embossed lug on the shaft.

3. The method according to claim 1, which comprises encapsulating the vane body with the sealing compound to form a first sealing hood and a second sealing hood at opposite axial ends of the vane body.

4. The method according to claim 1, which comprises disposing a damping ring in each case onto the shaft on a side of the first sleeve and the second sleeve which is remote from the vane body so that the damping ring comes to bear with one of the first sleeve and the second sleeve.

5. The method according to claim 1, which comprises forming the at least one aperture as an elongated hole.

6. The method according to claim 1, which comprises bending the shaft at right angles at a free end.

* * * * *